(12) United States Patent
August et al.

(10) Patent No.: US 8,917,161 B2
(45) Date of Patent: Dec. 23, 2014

(54) SYSTEMS AND METHODS FOR TRANSMITTING DATA USING NEAR FIELD COMMUNICATIONS

(71) Applicants: Clifford J. August, Langley (CA); Derek John Pyner, Delta (CA); Glenn Needham, Stonehouse (GB)

(72) Inventors: Clifford J. August, Langley (CA); Derek John Pyner, Delta (CA); Glenn Needham, Stonehouse (GB)

(73) Assignee: Clifford J. August, Langley, British Columbia (CA)

(*) Notice: Subject to any disclaimer, the term of this patent is extended or adjusted under 35 U.S.C. 154(b) by 177 days.

(21) Appl. No.: 13/657,799

(22) Filed: Oct. 22, 2012

(65) Prior Publication Data

US 2013/0113609 A1 May 9, 2013

Related U.S. Application Data

(60) Provisional application No. 61/550,361, filed on Oct. 21, 2011, provisional application No. 61/577,803, filed on Dec. 20, 2011, provisional application No. 61/622,522, filed on Apr. 11, 2012, provisional application No. 61/622,587, filed on Apr. 11, 2012, provisional application No. 61/643,061, filed on May 4, 2012, provisional application No. 61/682,290, filed on Aug. 12, 2012.

(51) Int. Cl.
| | |
|---|---|
| *H04Q 5/22* | (2006.01) |
| *G06K 7/01* | (2006.01) |
| *H04B 5/00* | (2006.01) |
| *H04W 4/00* | (2009.01) |
| *H04W 88/06* | (2009.01) |
| *H04W 12/02* | (2009.01) |

(52) U.S. Cl.
CPC ............. *G06K 7/01* (2013.01); *H04B 5/0031* (2013.01); *H04B 5/0062* (2013.01); *H04W 4/008* (2013.01); *H04W 88/06* (2013.01); *H04W 12/02* (2013.01)
USPC .......................................... 340/10.1; 340/5.62

(58) Field of Classification Search
CPC ............... G07C 3/00; G06Q 10/0875; G06K 19/07345; B23Q 3/15546; H04L 69/03; H04L 67/18; H04L 2463/102
USPC .......................................................... 340/10.1
See application file for complete search history.

(56) References Cited

U.S. PATENT DOCUMENTS

| | | |
|---|---|---|
| 4,165,575 A | 8/1979 | Neilsen |
| 5,098,633 A | 3/1992 | Hausler |

(Continued)

FOREIGN PATENT DOCUMENTS

| | | |
|---|---|---|
| WO | 2008035296 A3 | 3/2008 |
| WO | 2012100104 A1 | 7/2012 |
| WO | 2013059834 A1 | 4/2013 |

OTHER PUBLICATIONS

PCT International Searching Authority, International Search Report, PCT/US2012021933, Apr. 19, 2012, 8 pages.

(Continued)

*Primary Examiner* — Daniel Wu
*Assistant Examiner* — Frederick Ott
(74) *Attorney, Agent, or Firm* — Michael R. Schacht; Schacht Law Office, Inc.

(57) ABSTRACT

A data transmission system comprising a data bridge, a reader device, and a network access system. The data bridge comprises an RFID system, a network system, a memory module, and a processor operatively connected between the RFID system and the network system. The data bridge system operates in a first mode using the RFID system and a second mode using the network system. The reader device communicates with the memory module using the RFID system. The network access system communicates with the memory module using the network system.

7 Claims, 10 Drawing Sheets

(56) References Cited

U.S. PATENT DOCUMENTS

| | | | |
|---|---|---|---|
| 5,589,818 | A | 12/1996 | Queen |
| 5,793,359 | A | 8/1998 | Ushikubo |
| 6,013,949 | A | 1/2000 | Tuttle |
| 6,213,879 | B1 | 4/2001 | Niizuma et al. |
| 6,285,295 | B1 | 9/2001 | Casden |
| 6,424,303 | B1 | 7/2002 | Tsai |
| 6,441,723 | B1 | 8/2002 | Mansfield, Jr. et al. |
| 6,501,036 | B2 | 12/2002 | Rochon et al. |
| 6,650,254 | B1 | 11/2003 | Rix |
| 6,807,564 | B1 | 10/2004 | Zellner et al. |
| 6,903,662 | B2 | 6/2005 | Rix et al. |
| 6,940,974 | B2 | 9/2005 | August et al. |
| 6,961,425 | B2 | 11/2005 | August |
| 6,978,118 | B2 | 12/2005 | Vesikivi et al. |
| 6,983,124 | B1 | 1/2006 | Bayley et al. |
| 7,157,651 | B2 | 1/2007 | Rix et al. |
| 7,274,909 | B2 | 9/2007 | Perttilaet et al. |
| 7,567,780 | B2 | 7/2009 | August et al. |
| 7,570,166 | B2 | 8/2009 | Alden et al. |
| 7,760,100 | B2 | 7/2010 | August et al. |
| 7,786,893 | B2 | 8/2010 | Fuller et al. |
| 7,801,287 | B1 | 9/2010 | August |
| 2002/0167500 | A1 | 11/2002 | Gelbman |
| 2003/0016136 | A1 | 1/2003 | Harvey |
| 2004/0002305 | A1 | 1/2004 | Byman-Kivivuori et al. |
| 2004/0020994 | A1* | 2/2004 | Muehl et al. ............... 235/492 |
| 2004/0113892 | A1 | 6/2004 | Mears et al. |
| 2005/0030160 | A1* | 2/2005 | Goren et al. ............... 340/10.5 |
| 2005/0054408 | A1 | 3/2005 | Steil et al. |
| 2005/0075169 | A1 | 4/2005 | Cheng et al. |
| 2006/0192018 | A1 | 8/2006 | Tsai et al. |
| 2006/0258289 | A1 | 11/2006 | Dua |
| 2006/0289657 | A1 | 12/2006 | Rosenberg |
| 2007/0046467 | A1* | 3/2007 | Chakraborty et al. ..... 340/572.1 |
| 2007/0200684 | A1* | 8/2007 | Colby ....................... 340/10.51 |
| 2007/0234215 | A1 | 10/2007 | Graham et al. |
| 2008/0195641 | A1 | 8/2008 | Tischer et al. |
| 2008/0279138 | A1 | 11/2008 | Gonikberg et al. |
| 2009/0322277 | A1 | 12/2009 | Cargin, Jr. et al. |
| 2010/0178866 | A1 | 7/2010 | Jalkanen |
| 2010/0243742 | A1 | 9/2010 | Ullmann et al. |
| 2010/0250818 | A1 | 9/2010 | Gill et al. |
| 2011/0063994 | A1 | 3/2011 | Nix et al. |
| 2012/0190300 | A1 | 7/2012 | August et al. |

OTHER PUBLICATIONS

PCT International Searching Authority, International Search Report, PCT/US2012061397, Mar. 25, 2013, 9 pages.

* cited by examiner

SYSTEMS AND METHODS FOR TRANSMITTING DATA USING NEAR FIELD COMMUNICATIONS

RELATED APPLICATIONS

This application, U.S. application Ser. No. 13/657,799 filed Oct. 22, 2012, claims priority to U.S. Provisional Patent Application Ser. Nos. 61/550,361, filed Oct. 21, 2011, 61/577,803 filed Dec. 20, 2011, 61/622,522 filed Apr. 11, 2012, 61/622,587 filed Apr. 11, 2012, 61/643,061 filed May 4, 2012, and 61/682,290 filed Aug. 12, 2012.

The contents of all related applications listed above are incorporated herein by reference.

TECHNICAL FIELD

The present invention relates to near field communications (NFC) systems and, in particular, to NFC systems that store data in a manner that facilitates the transfer of data from an NFC system to other computing devices.

BACKGROUND

NFC systems employ a set of standards that allow communications between two NFC devices by touching them together or bringing them into close contact (e.g., up to 20 cm) with each other. Both of the NFC devices may be powered, or one of the devices may be a powered NFC device and the other may be an unpowered NFC device, commonly referred to as a "tag".

Like radio frequency identification (RFID) systems, NFC systems employ magnetic induction between two loop antennas to communicate data. Unlike RFID systems, however, NFC systems allow bi-directional or two-way communications between two compliant NFC devices. Communication between two powered NFC systems consumes far less power than other near range communications systems such as Wi-Fi and Blue Tooth. And unlike Wi-Fi and Blue Tooth systems, NFC devices do not require manual configuration to establish communication. The relatively short range of NFC devices as compared to other communications systems reduces, but does not eliminate, the likelihood that the transmitted data will be intercepted.

The need exists for improved NFC systems and devices that address a range of issues associated with using data stored on and transferred from NFC systems.

SUMMARY

The present invention may be embodied as a data transmission system comprising a data bridge, a reader device, and a network access system. The data bridge comprises an RFID system, a network system, a memory module, and a processor operatively connected between the RFID system and the network system. The data bridge system operates in a first mode using the RFID system and a second mode using the network system. The reader device communicates with the memory module using the RFID system. The network access system communicates with the memory module using the network system.

The present invention may also be embodied as a data transmission system comprising an RFID system and a reader system. The RFID system comprises an RFID module, a memory module storing menus and data, and a switch. The reader system comprises an RFID reader. Activating the switch causes the RFID system to transfer a menu to the reader system. The reader system displays the menu. Activating the switch causes the RFID system to transfer data to the reader system based on a selection made in response to the menu.

The present invention may also be embodied as a method of transmitting data comprising the following steps. A data bridge comprising an RFID system, a network system, a memory module, and a processor is provided. The processor is operatively connected between the RFID system and the network system. A reader device is provided to allow communication with the memory module using the RFID system. A network access system is provided to allow communication with the memory module using the network system. The data bridge system operates in a first mode using the RFID system. The data bridge system operates in a second mode using the network system.

DETAILED DESCRIPTION

The principles of the present invention may be embodied in many different forms, and a number of example data transmission systems and methods employing the principles of the present invention will be described below.

I. First Example Data Bridge System

Figure 1:
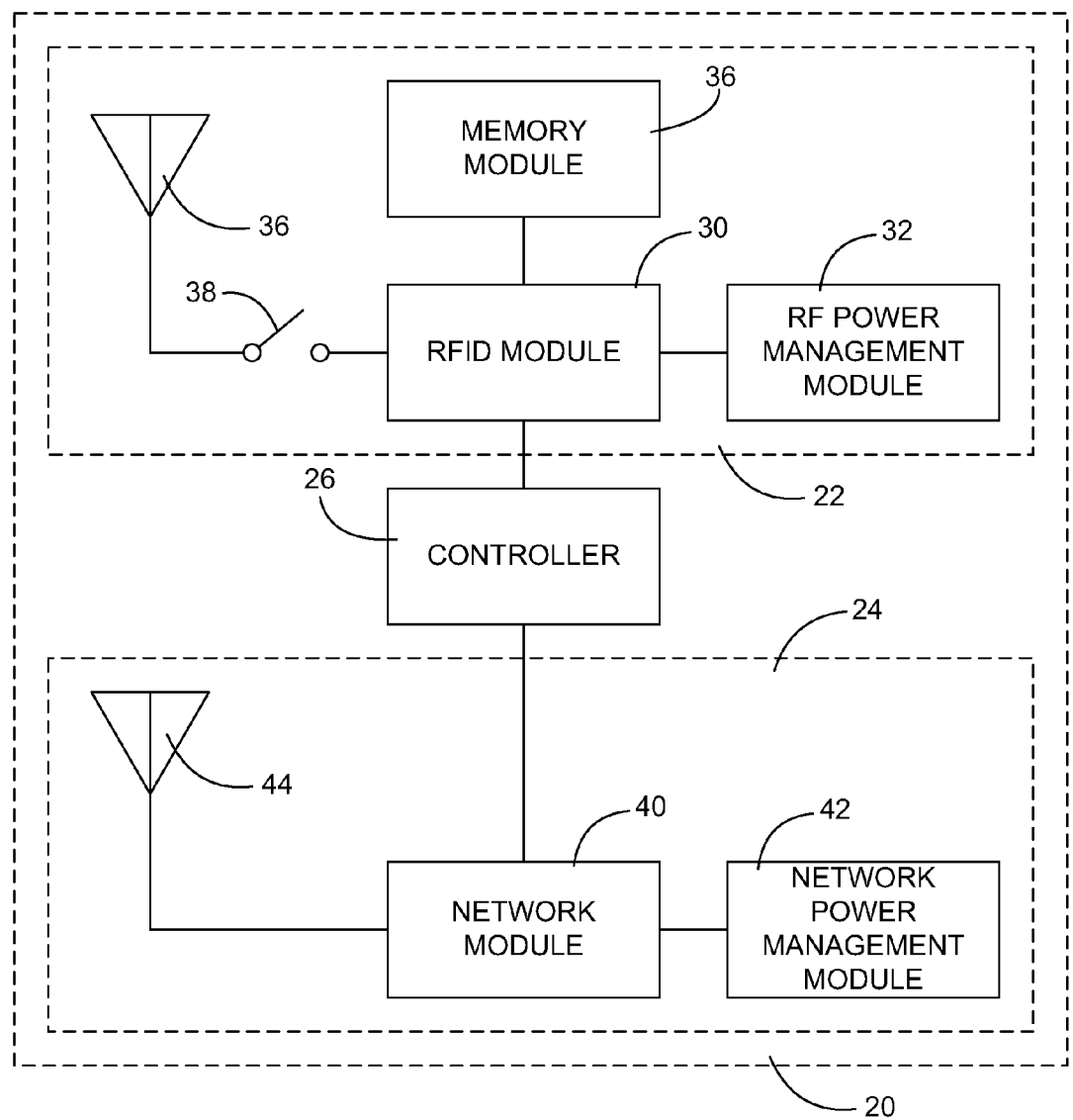
FIG. 1 is a block diagram illustrating a first example data bridge system of the present invention.

The present invention may be embodied as a data bridge system 20 as depicted in FIG. 1 of the drawing. The example data bridge system 20 comprises a NFC system 22, a network system 24, and a controller 26.

The example NFC system 22 comprises an RFID module or transceiver 30, an RF power management module 32, a memory module 34, an antenna 36, and, a switch 38. The example RFID module 30 may be active or passive. The memory module 34 is capable of storing data for subsequent retrieval and may be provided in any one of a number of standard memory sizes, with larger memory modules typically being associated with greater cost. The example switch 38 allows the possessor of the data bridge system 20 to control transmission of data using the NFC system 22 but may be omitted in some implementations of the data bridge system 20. As will be discussed in further detail below, the example RFID module 30 is configured to communicate data with (e.g., transmit data to and/or receive data from) a remote device having an NFC (e.g, RF) module that conforms to similar communication standards. Examples of NFC systems that may be used as the example NFC system 22 are disclosed in the Applicant's co-pending U.S. patent application Ser. No. 13/354,319 and U.S. Pat. Nos. 7,567,780 and 7,760,100, the contents of which are incorporated herein by reference.

The example network system 24 comprises a network module 40, a network power management module 42, and an antenna 44. The network module 40 may be, as examples, a Wi-Fi transceiver, a cellular transceiver, and/or a Blue Tooth transceiver. As will be discussed in further detail below, the example network module is configured to communicate data with (e.g., transmit data to and/or receive data from) a remote device having a network module that conforms to similar communication standards.

The controller 26 is operatively connected to the RFID module 30 and the network module 40. The controller 26 may conventionally comprise a processor and non-volatile and/or non-volatile memory and is capable of running software to control the operation of and transfer data between the RFID module 30 and the network module 40. The power management modules 32 and 42 minimize power consumption by the RFID module 30 and network module 40, respectively. The memory module 34 allows the NFC system 22 of the data bridge system 20 to store data that may be accessed using the antenna 36 and the RFID module 30 or, alternatively, can be accessed using the antenna 44 and network module 40 through the controller 26.

The RFID module 30 is capable of transmitting and receiving data at significantly lower energy consumption rates than the example network module 40. The data bridge system 20 thus allows data stored by the memory module 34 to be transmitted from and/or received by the data bridge system 20 in a first or low energy consumption mode using the RFID module 30 of the NFC system 22 or in a second or high energy consumption mode using the network module 40 of the network system 24. The data bridge system 20 thus optimizes energy consumption when transmitting and/or receiving data depending upon requirements of the data being transmitted and available data transmission facilities or equipment. The example controller 26 may be programmed to detect the presence of one or both of a remote RF reader and/or a network signal and select the optimal data transmission system (e.g., RFID module 30 or network module 40). The example data bridge system 20 may be embodied or referred to as, for example, a digital signpost that acts as a portal for connectivity to a cellular network, Wi-Fi network, and/or Blue Tooth network using information stored on the memory module 34 of the RFID system 30.

II. First Example Data Transmission System Using Data Bridge System

Figure 2:
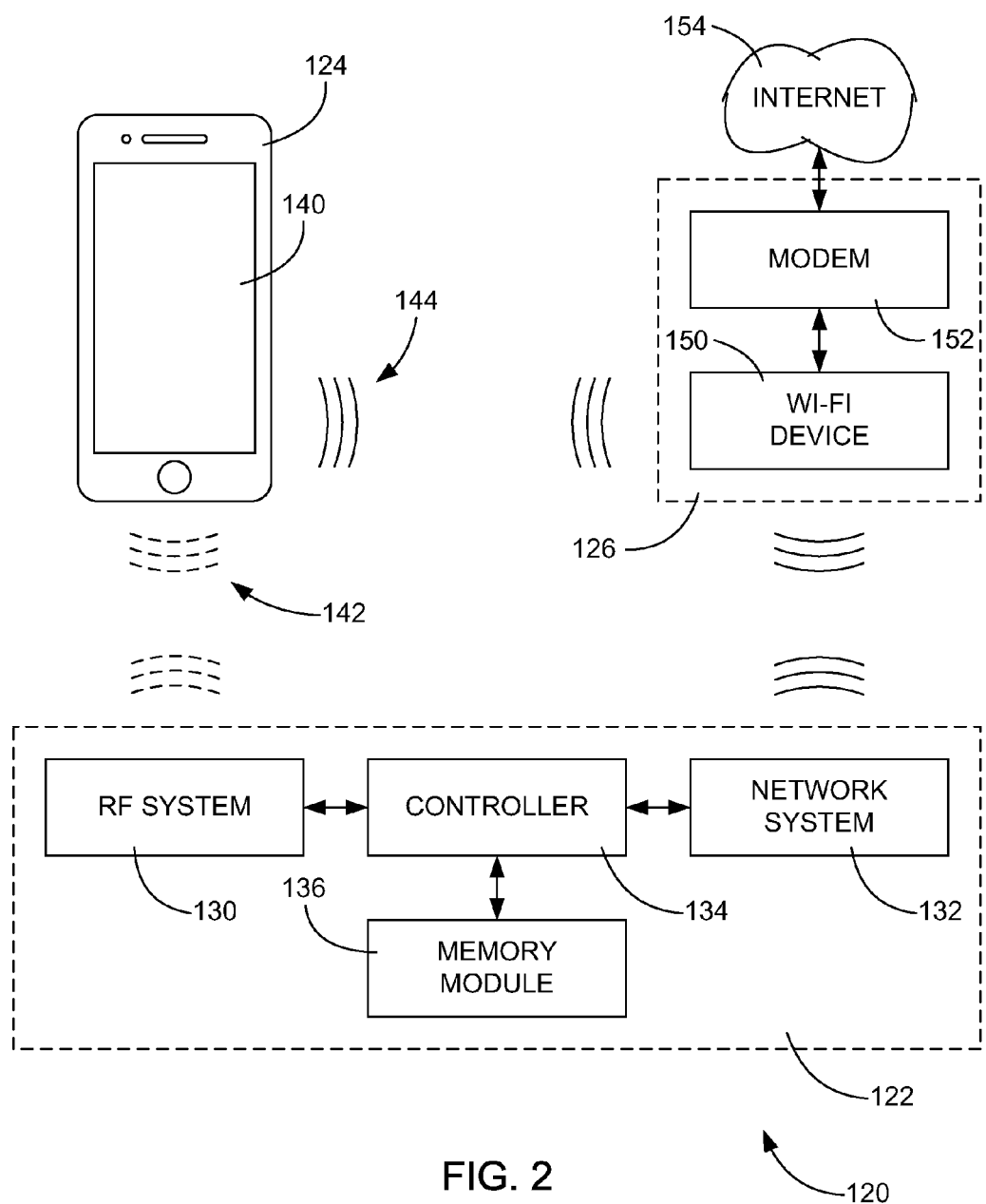
FIG. 2 is a block diagram of a first example data transmission system incorporating a data bridge such as the first example data bridge system depicted in FIG. 1.

Referring now to FIG. 2 of the drawing, depicted at 120 therein is an example data transmission system employing a data bridge system 122, a reader device 124, and a network access system 126.

The example data bridge system 122 comprises a NFC system 130, a network system 132, a controller 134, and a memory module 136. Like the NFC system 22 described above, the example NFC system 130 is or may be a powered or unpowered system and may be switched or un-switched. The example NFC system 130 may be implemented using the example NFC system 22 described above, but other configurations of NFC systems may be used instead or in addition. The example network system 132 is a Wi-Fi system. The example memory module 136 is capable of storing data for subsequent retrieval and may be provided in any one of a number of standard memory sizes. A conventional Flash memory device may be used to form the example memory module 136.

The example reader device 124 is a cellular telephone, tablet computer, laptop computer, or other device with components such as a input/display system 140 (e.g., touch screen display, buttons, and/or speakers) to allow a user to interact with the reader device 124 through a user interface. The example reader device 124 further comprises an RF transceiver system 142 that allows communication with the NFC system 130. The example reader device 124 comprises a Wi-Fi transceiver 144 and, typically but not necessarily in the example transmission system 120, one or more of a cellular transceiver and/or a blue tooth transceiver. As is conventional, the example reader device 124 comprises a power system (not shown) with a charger and/or battery or other power storage device that allows the example host device 124 to function as a powered NFC device.

The example network access system 126 comprises a Wi-Fi device 150 and a modem 152. The example Wi-Fi device 120 may conform to existing Wi-Fi standards but in any event may be compatible with the example network system 132 of the data bridge system 122 and/or the Wi-Fi transceiver 144. The example modem 152 is connected to the internet 154. However, instead of being connected to the Internet using a modem such as the modem 152, the Wi-Fi device may be connected to a stand-alone computing device or a computing device that is itself connected to other computing devices such as over a LAN, WAN, or the Internet.

Data from the memory module 136 may be read by the reader device 124 using the NFC system 130 and the RF transceiver system 142. The data read from the memory module 136 may be used to configure the reader device 124 to connect to the network access system 126. Data downloaded to the reader device 124 from the Internet 154 through the network access system 126 can then be used to configure the reader device 124 to access data stored on the memory module 136 using the network system 132 at Wi-Fi transfer speeds.

Alternatively, if the reader device 124 may be connected directly to the Internet 154 through, for example, a data plan provided by a cellular telephone network, the example network access system 126 need not be provided and/or used.

The data bridge system 122 thus may act as a "digital signpost" that can allow data to be read from and written to the memory module 136 through a network system, in this case a Wi-Fi network incorporating the network system 132, the Wi-Fi transceiver 142, and/or Wi-Fi device 150. In this case, the data bridge system 122 thus also acts as a portal for connectivity to the cellular network or Wi-Fi (WLAN) network via information stored on the memory module 136. Accordingly, the example data transmission system 120 can be used to eliminate the limitations of relatively slow data transmission rates of RF (e.g., NFC and RFID) systems by establishing a parallel channel to the memory module 136 through the network system 132, the network access system 126, and the Wi-Fi transceiver 144.

III. Second Example Data Bridge System

Figure 3:
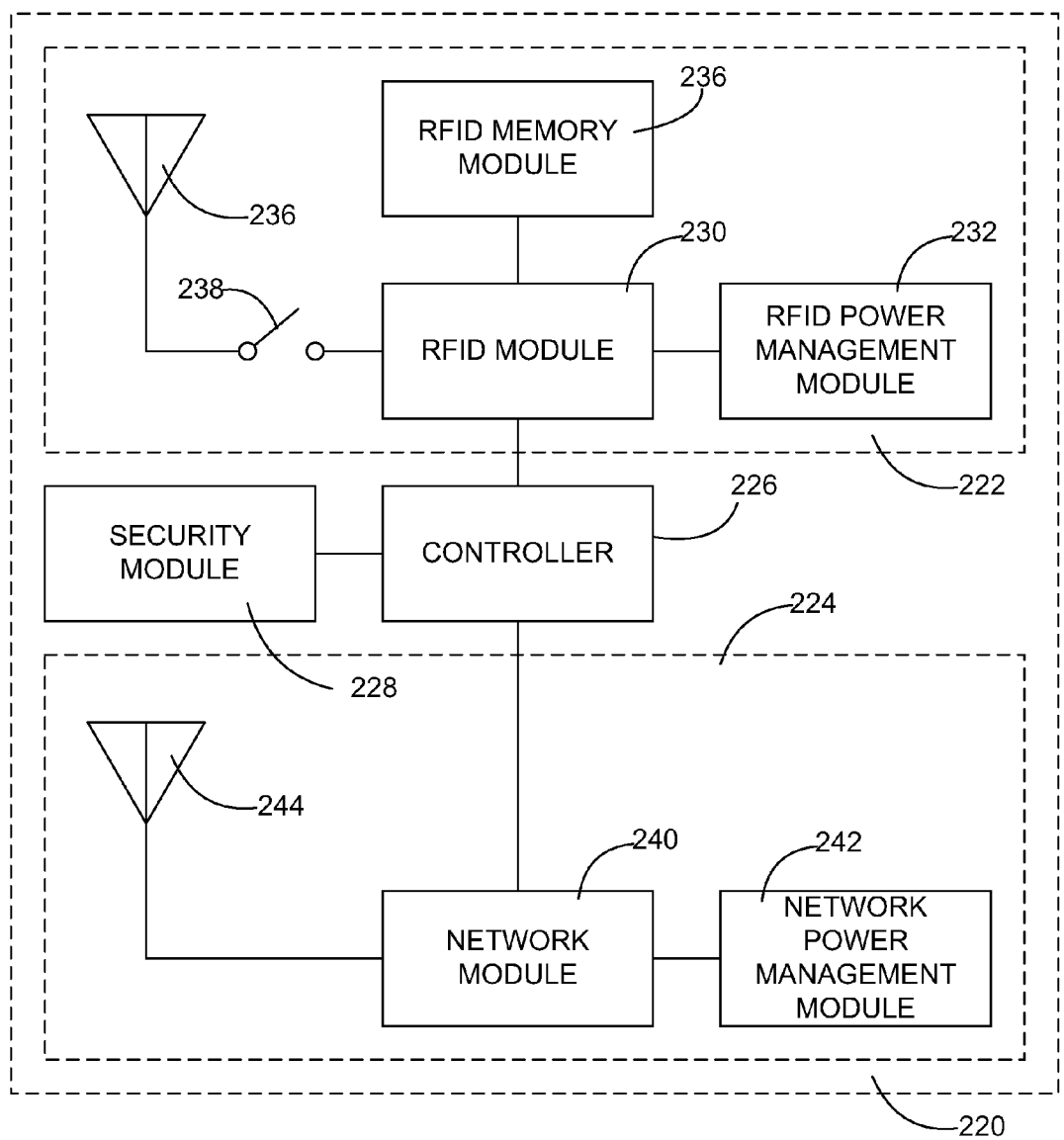
FIG. 3 is a block diagram illustrating a second example data bridge system of the present invention.

The present invention may also be embodied as a data bridge system 220 as depicted in FIG. 3 of the drawing. The example data bridge system 220 comprises a NFC system 222, a network system 224, a controller 226, and a security module 228.

Like the first example data bridge system 20, the example NFC system 222 comprises an RFID module or transceiver 230, an RF power management module 232, a memory module 234, an antenna 236, and, a switch 238. Again, the example RFID module 230 may be active or passive. The memory module 234 is capable of storing data for subsequent retrieval and may be provided in any one of a number of standard memory sizes. The example switch 238 allows the possessor of the data bridge system 220 to control transmission of data using the NFC system 222 but may be omitted in some implementations of the data bridge system 220. As will be discussed in further detail below, the example RFID module 230 is configured to communicate data with (e.g., transmit data to and/or receive data from) a remote device having an RF (e.g, NFC and/or RFID) module that conforms to similar communication standards.

The example network system 224 comprises a network module 240, a network power management module 242, and an antenna 244. The network module 240 may be, as examples, a Wi-Fi transceiver, a cellular transceiver, and/or a Blue Tooth transceiver. As will be discussed in further detail below, the example network module is configured to communicate data with (e.g., transmit data to and/or receive data from) a remote device having a network module that conforms to similar communication standards.

The controller 226 is operatively connected to the RFID module 230, the network module 240, and the security module 228. The controller 226 may conventionally comprise a processor and non-volatile and/or non-volatile memory and is capable of running software to control the operation of and transfer data between the RFID module 230 and the network module 240. The power management modules 232 and 242 minimize power consumption by the RFID module 230 and network module 240, respectively. The memory module 234 allows the NFC system 222 of the data bridge system 220 to store data that may be accessed using the antenna 236 and the RFID module 230 or, alternatively, can be accessed using the antenna 244 and network module 240 through the controller 226.

The security module 228 is represented as a separate element in FIG. 3 but may be incorporated into the controller or may even be entirely remote from the data bridge system 220. For example, the security module 228 may be implemented on a separate computer such as server accessed over the internet (e.g., in "the cloud"). The security module 228 encrypts or otherwise secures the data transmitted to and from the data bridge system 220 using the RFID module 230.

The RFID module 230 is capable of transmitting and receiving data at significantly lower energy consumption rates than the example network module 240. The data bridge system 220 thus allows data stored by the memory module 234 to be transmitted from and/or received by the data bridge system 220 in a first or low energy consumption mode using the RFID module 230 of the NFC system 222 or in a second or high energy consumption mode using the network module 240 of the network system 24. The data bridge system 220 thus optimizes energy consumption when transmitting and/or receiving data depending upon requirements of the data being transmitted and available data transmission facilities or equipment. The example controller 226 may be programmed to detect the presence of one or both of a remote RF reader and/or a network signal and select the optimal data transmission system (e.g., RFID module 230 or network module 240). The example data bridge system 220 may be embodied or referred to as, for example, a digital signpost that acts as a portal for connectivity to a cellular network, Wi-Fi network, and/or Blue Tooth network using information stored on the memory module 234 of the RFID system 230.

With a security module such as the example security module 228, the data bridge system 220 may be used as a remote secure NFC payment terminal. Physical security may be accomplished by building the data bridge system 220 into a physical structure access to which is limited (e.g., the frame of a sign located in an unsecured location such as a bus shelter).

Data transmitted using the example data bridge system 220 may thus be encrypted in a secure manner. Additionally, two way communication between the data bridge system 220 and a remote device may be established by tapping and re-tapping the switch 238 as will be described in further detail below.

IV. Location Aware RF Data Transmission System

Figure 4:
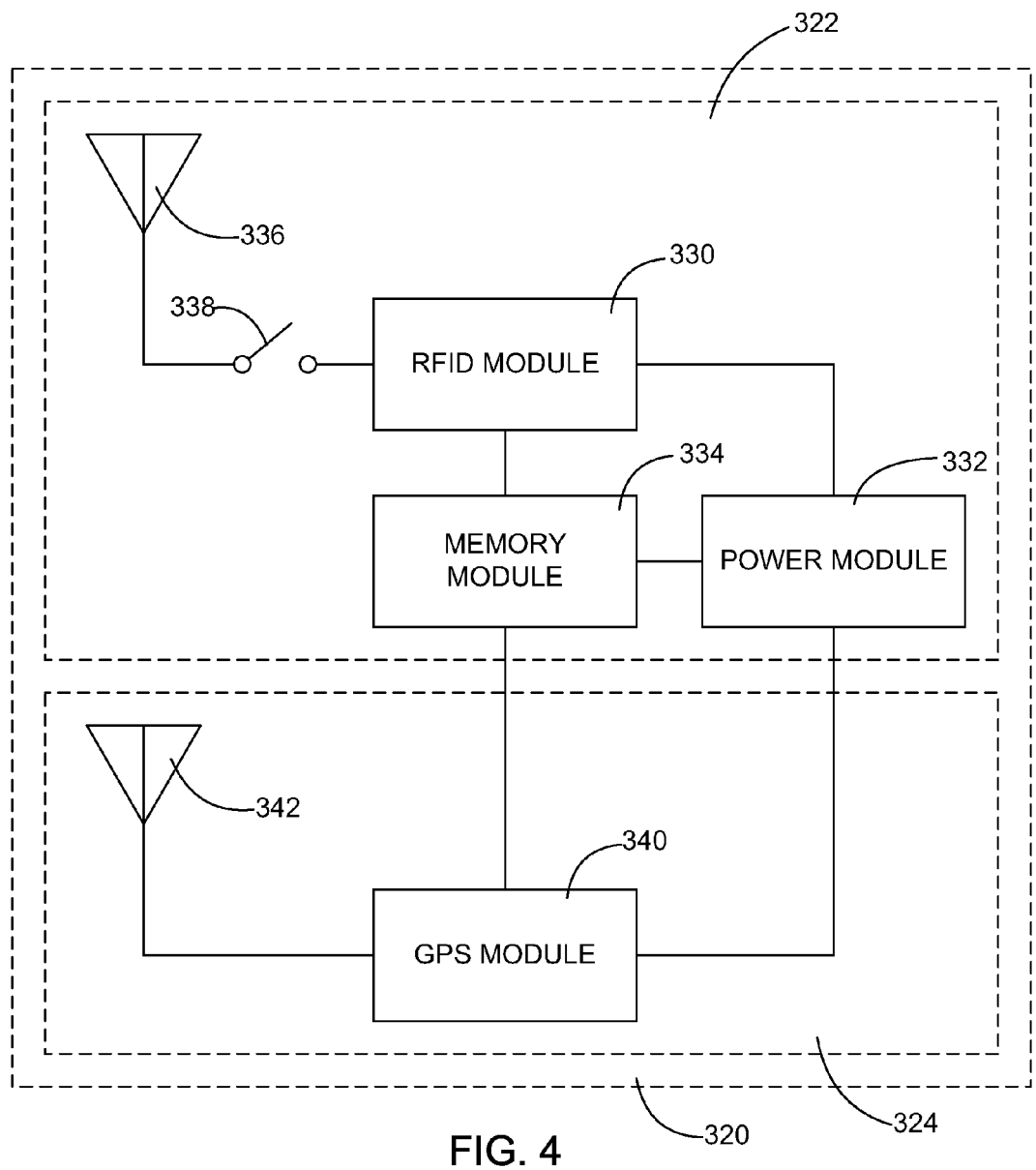
FIG. 4 is a block diagram illustrating a location aware data system of the present invention.
Figure 5:
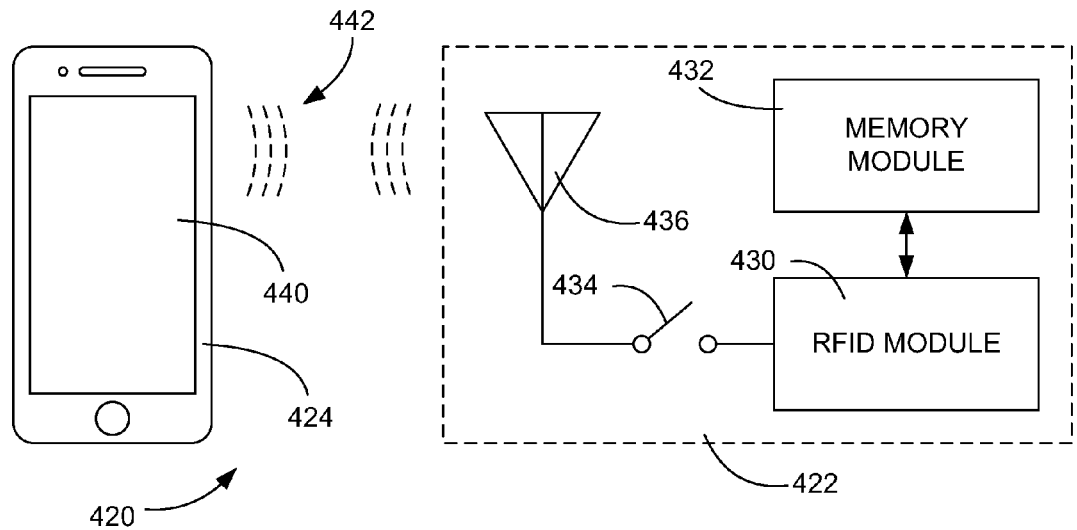
FIG. 5 is a block diagram illustrating a second example data transmission system of the present invention.

The present invention may also be embodied as a location aware data transmission stem 320 as depicted in FIG. 4 of the drawing. The example data bridge system 320 comprises a NFC system 322, and a GPS system 324. The NFC system 322 and GPS system 324 are physically attached to or otherwise associated with each other or another physical object such that the physical location of the GPS system 324 can be assumed to be the same as that of the NFC system 322.

Like the first example data bridge system 30, the example NFC system 322 comprises an RFID module or transceiver 330, a power module 332, a memory module 334, an antenna 336, and, a switch 338. Again, the example RFID module 330 may be active or passive. The memory module 334 is capable of storing data for subsequent retrieval and may be provided in any one of a number of standard memory sizes. The example switch 338 allows the possessor of the data bridge system 320 to control transmission of data using the NFC system 322 but may be omitted in some implementations of the data bridge system 320. As will be discussed in further detail below, the example RFID module 330 is configured to communicate data with (e.g., transmit data to and/or receive data from) a remote device having an RF (e.g, NFC and/or RFID) module that conforms to similar communication standards. The example GPS system 324 comprises a GPS module 340 and an antenna 342.

The power module 332 is configured to provide power to at least the GPS module 340 when necessary and to the RFID module 330 and memory module 334 when these modules 330 and 334 operate in a powered mode. The GPS module 340 is further operatively connected to the memory module 334 such that location data may be stored in the memory module 334. When data is transmitted from the NFC system 322 from the memory module 332, the location data may also be transmitted, allowing a reader device to be aware of the location of the NFC system 322 and, as a result, to any item to which the NFC system 322 is secured or otherwise physically associated.

A GSP module like the example GPS module 340 may be added to the data bridge systems 20, 122, and 220 described herein to provide location aware capabilities in the context described above.

V. RF Data Storage System with Enhanced User Interface

Figures 6A, 6B:
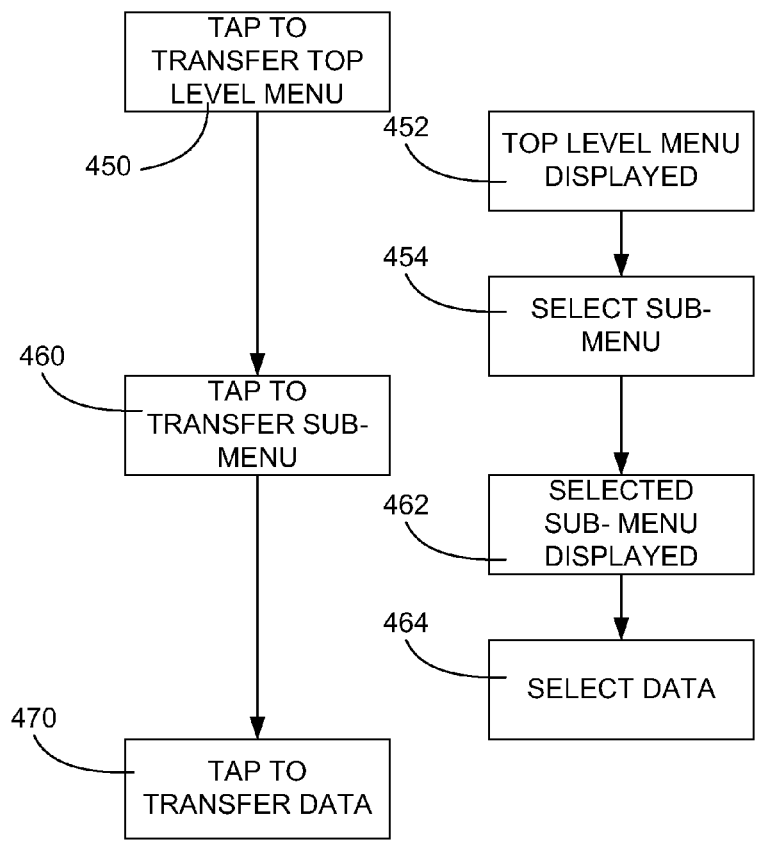
FIGS. 6A and 6B are flow charts depicting an example of use of the second example data transmission system.

Referring now to FIGS. 6A and 6B of the drawing, depicted at 420 therein is a data transmission system configured to optimize transmission of data from an NFC system 422 to a reader device 424.

The example data transmission system 422 comprises a NFC system 430, a memory module 432, a switch 434, and an antenna 436. The example NFC system 430 is or may be a powered or unpowered system. The switch 434 allows the user to control access to the data stored in the memory module 432. The example memory module 432 is capable of storing data for subsequent retrieval and may be provided in any one of a number of standard memory sizes. A conventional Flash memory device may be used to form the example memory module 432.

The example reader device 424 is a cellular telephone, tablet computer, laptop computer, or other device with components such as a input/display system 440 (e.g., touch screen display, buttons, and/or speakers) to allow a user to interact with the reader device 424 through a user interface. The example reader device 424 further comprises an RF transceiver system 442 that allows communication with the NFC system 430. The example reader device 424 may further comprise a Wi-Fi transceiver, a cellular transceiver, and/or a blue tooth transceiver. As is conventional, the example reader device 424 comprises a power system (not shown) with a charger and/or battery or other power storage device that allows the example host device 424 to function as a powered NFC device.

In the example data transmission system 420, the NFC system 422 may be referred to as the "target", while the reader device 424 may be referred to as the "initiator". The process of transferring data between the NFC system (target) and the reader device 424 (initiator) employs multiple "taps" on the switch 434 in combination with the input/display system 440 to form an interface that facilitates the transfer of data between the NFC system 422 and the reader device 424. In particular, the nature of NFC data transmission protocols allows only small amounts of data to be transferred during each REQ/ACK (request/acknowledgement) cycle. For RFC tags having high capacity memory modules, the transmission of large amounts of data requires an extended or multiple couplings or REQ/ACK cycles before a particular unit of data is transferred, especially from the NFC system 422 to the reader device 424.

In the example data transmission system 420, the user "taps" the switch 434 of the NFC system 422 to perform an initial data download from the NFC system 422 to the reader device 424. The initial data download contains menu data that allows the user to identify, on the more advanced input/display system 440 on the reader device, data to be downloaded from the NFC system 422 to the reader device 424. Subsequent "taps" can be used to download additional menu data that further allows the user to identify a particular piece of data to be transferred from the NFC system 422 to the reader device 424 or to use the reader device 424 to change data on the NFC system 422. As one example, the data stored on the memory module 432 may be configured in a hierarchical data structure that can be navigated using the menus and sub menus. The example data transmission system 420 thus obviates the need to download all of the data from the NFC system 422 to the reader device 424 before finding the particular piece of data desired.

FIGS. 6A and 6B illustrate one example of the process of using the example data transmission system 420 to transfer data from the NFC system 422 to the reader device 424. Initially at a step 450 in FIG. 6A, the switch 434 of the NFC system 422 is tapped to transfer a top level menu. At step 452 as shown in FIG. 6B, the top level menu is displayed on the input/display system 440, and a desired sub-menu is selected at step 454. At step 460, the switch 434 is re-tapped to transfer the desired sub-menu from the NFC system 422 to the reader device 424. At step 462 in FIG. 6B, the sub-menu is displayed on the input/display system 440, and desired data is selected at step 464. At step 470, the switch 434 is re-tapped to transfer the desired data from the NFC system 422 to the reader device 424.

Figure 7:
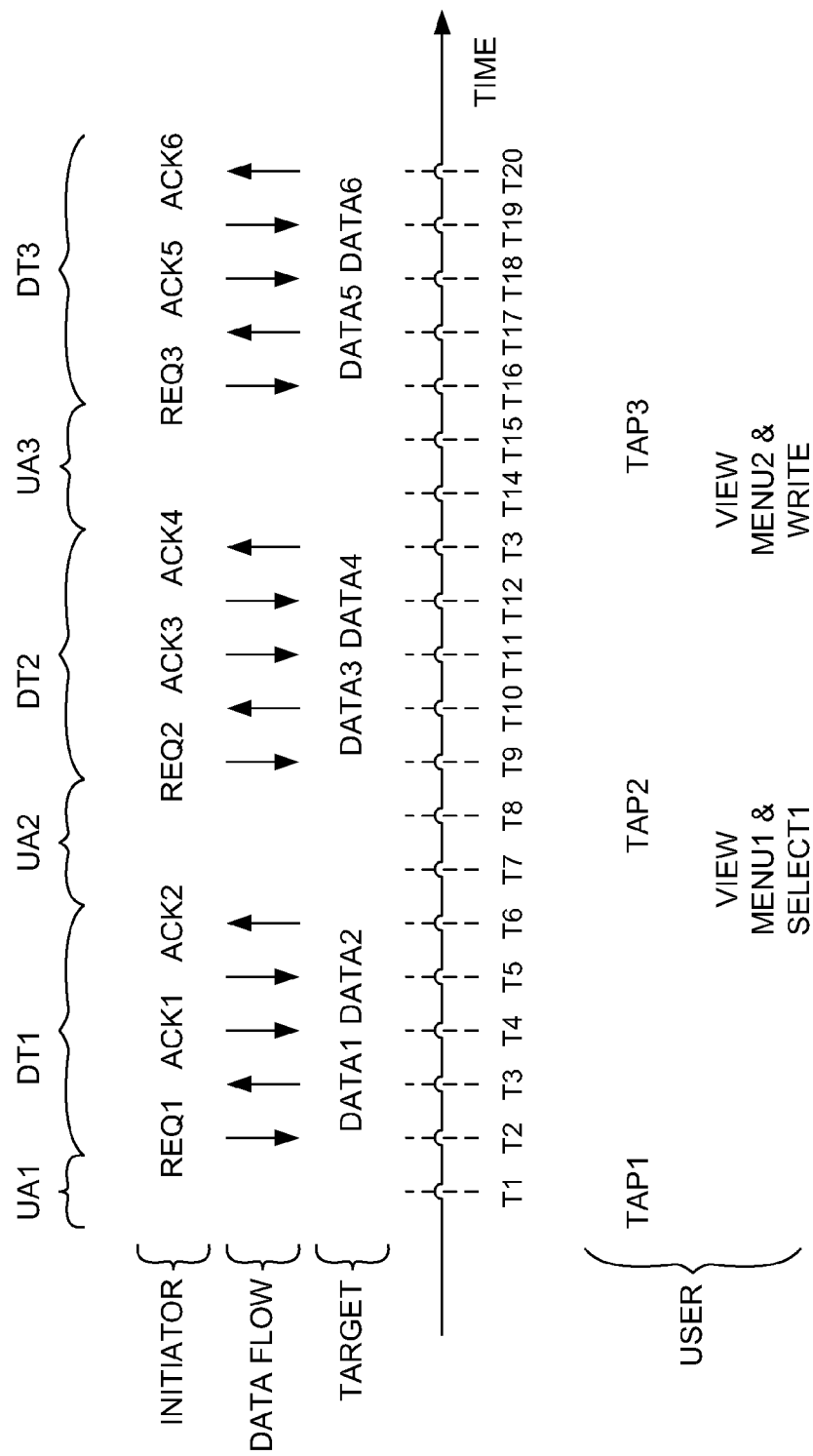
FIG. 7 is a timing diagram illustrating an example of use of the second example data transmission system.

FIG. 7 contains a time line illustrating the process of transferring data from the NFC system 422 (target) to the reader device 424 (initiator) and also from the reader device 424 (initiator) to the NFC system 422 (target). At a time T1, a first user action UA1 is performed by tapping the switch 434.

At times T2-T6, a first data transfer sequence DT1 is performed using an appropriate REQ/ACK sequence. During this first data transfer sequence DT1, the initiator requests a menu from the target (T3), and the target sends a first or top-level menu to the initiator (T5). At times T7 and T8, a second user action sequence UA2 is performed by viewing in the time period T7 the first menu and selecting data (in this example a sub-menu) and then re-tapping the switch 434 at T8 to transfer the selected data.

At times T9-T13, a second data transfer sequence DT2 is performed, again using an appropriate REQ/ACK sequence. During this second data transfer sequence DT2, the initiator requests a sub-menu from the target (T10), and the target sends a first or top-level menu to the initiator (T12). At times T14 and T15, a third user action sequence UA3 is performed by viewing in the time period T14 a menu and selecting data (e.g., desired data) and then re-tapping the switch 434 at T15 to transfer the selected data.

At times T16-T20, a third data transfer sequence DT2 is performed, again using an appropriate REQ/ACK sequence. During this third data transfer sequence DT3, the initiator requests the data selected at time period T14 (the desired data) from the target (T17), and the target sends the selected data (the desired data) to the initiator (T19).

The example data transmission system 420 employs multiple queries or connections within a single "conversation" between an initiator and a target to facilitate the transfer of data between the initiator and the target within the relatively limited data transmission rates of systems such as the RFID systems 430 and 442 described herein.

VI. Supervision Systems and Methods Using RF Data Storage Systems

Figure 8:
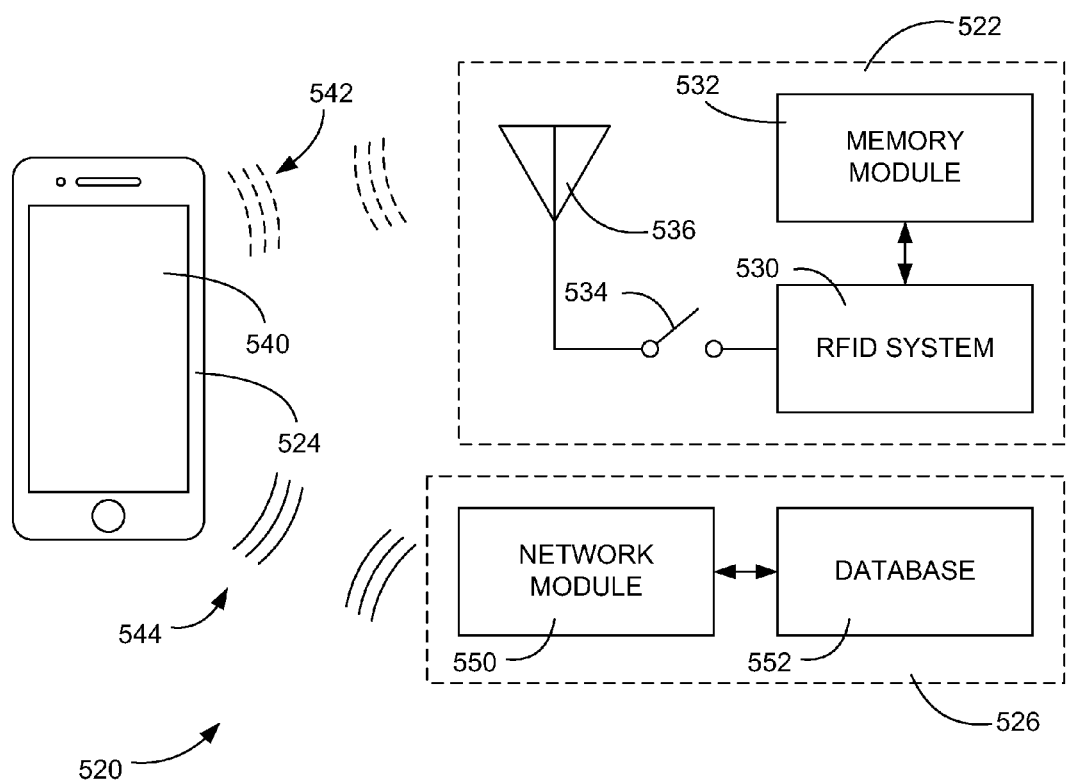
FIG. 8 is a block diagram depicting a third example data transmission system of the present invention.

Referring now to FIG. 8 of the drawing, depicted at 520 therein is a data transmission system comprising an NFC system 522, a reader device 524, and a data storage system 526. The example data transmission system 520 comprises software that allows the data transmission system to be used as an employee supervision system.

The example data bridge system 522 comprises a NFC system 530, a memory module 532, a switch 534, and an antenna 536. The example NFC system 530 is or may be a powered or unpowered system. The switch 534 allows the user to control access to the data stored in the memory module 532. The example memory module 532 is capable of storing data for subsequent retrieval and may be provided in any one of a number of standard memory sizes. A conventional Flash memory device may be used to form the example memory module 532.

The example reader device 524 is a cellular telephone, tablet computer, laptop computer, or other device with components such as a input/display system 540 (e.g., touch screen display, buttons, and/or speakers) to allow a user to interact with the reader device 524 through a user interface. The example reader device 524 further comprises an RF transceiver system 542 that allows communication with the NFC system 530. The example reader device 524 further comprises a Wi-Fi transceiver 544. Often, reader devices such as the example reader device 524 also include a cellular transceiver and/or a blue tooth transceiver. As is conventional, the example reader device 524 comprises a power system (not shown) with a charger and/or battery or other power storage device that allows the example host device 524 to function as a powered NFC device.

The example data storage system 526 comprises a network module 550 and a database 552. The network module 40 may be, as examples, a Wi-Fi transceiver, a cellular transceiver, and/or a Blue Tooth transceiver. As will be discussed in further detail below, the example network module 550 and transceiver 544 of the remote device 524 are Wi-Fi devices that conform to the same communication standards and thus are capable of communicating data with each other (e.g., transmit data to and/or receive data from) each other. The database 552 is capable of storing data and allowing data to be sorted, rearranged, accessed, and otherwise further processed. The database 552 may be stored on a computer directly connected to the network module 550, or the network module 550 may be connected to a network or the Internet to allow the database 552 to be maintained remotely and/or in a cloud-based system.

As will be described in detail below, the example data transmission system 520 may be used in a commercial setting to supervise, educate, and monitor employees and verify that employee work meets predetermined standards. In particular, workers in many industries are spread out over large areas, making supervision of employees difficult and time consuming. And training of new employees requires substantial management time and resources, especially in industries with high turnover.

Figure 9:
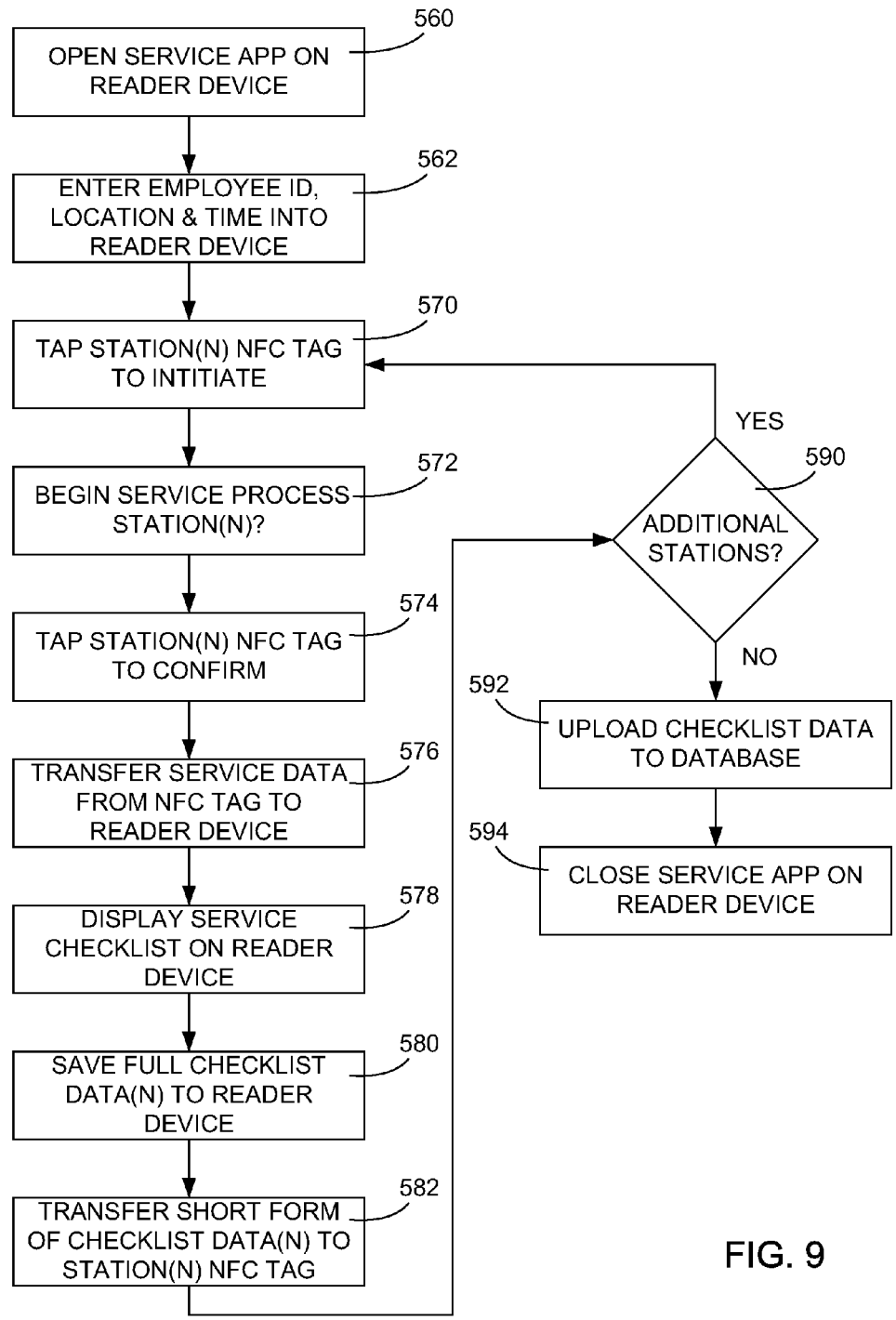
FIG. 9 is a flow chart depicting an example of use of the third example data transmission system.

An example of the logic implemented by software used as part of the employee supervision system running on the data transmission system 520 is depicted in FIG. 9. The supervision system is initiated by opening a service app on the reader device 524 at step 560 and entering employee identification, time, and location data at step 562. The time and location data may be automatically entered by a typical reader device 524.

The employee then proceeds to a first station and, at step 570, taps the switch 534 to begin the transfer of an initial data unit from the NFC tag forming the NFC system 522 to the reader device 524. At step 572, a service process is initiated for the first station. The initial data unit may be a top level menu as described above with respect to the system 420. The initial data unit will inform the employee of service process to be performed and may be associated with any service related to the first station, such as educational, maintenance, and/or repair service processes. At step 574, the employee again taps the switch 534 to select a particular service process, and a second data unit is downloaded. The second data unit may be, for example, a checklist of items to be inspected at the first station. In the example of a checklist, the employee inspects the first station according to the checklist at step 578 and stores confirmation data on the reader device 524 at step 580. A short form of the completed checklist is transferred from the reader device 524 to the NFC system at step 582 for auditing purposes.

At step 590, the system determines whether any additional stations are to be serviced. If so, the process returns to step 570, and steps 570-582 are repeated until all stations have been serviced. When all stations have been serviced, the process proceeds to step 592 at which the checklist data stored is uploaded to the database 552 using the network module 550. The service app on the reader device 524 is then terminated at step 592.

The benefits of the example employee supervision system described herein are that the data is internal and thus can be preserved and recorded for auditing purpose, the data is securely collected and transmitted, and data can be collected and analyzed on a periodic basis such as hourly or daily.

VII. Third Example Data Communication System

Figure 10:
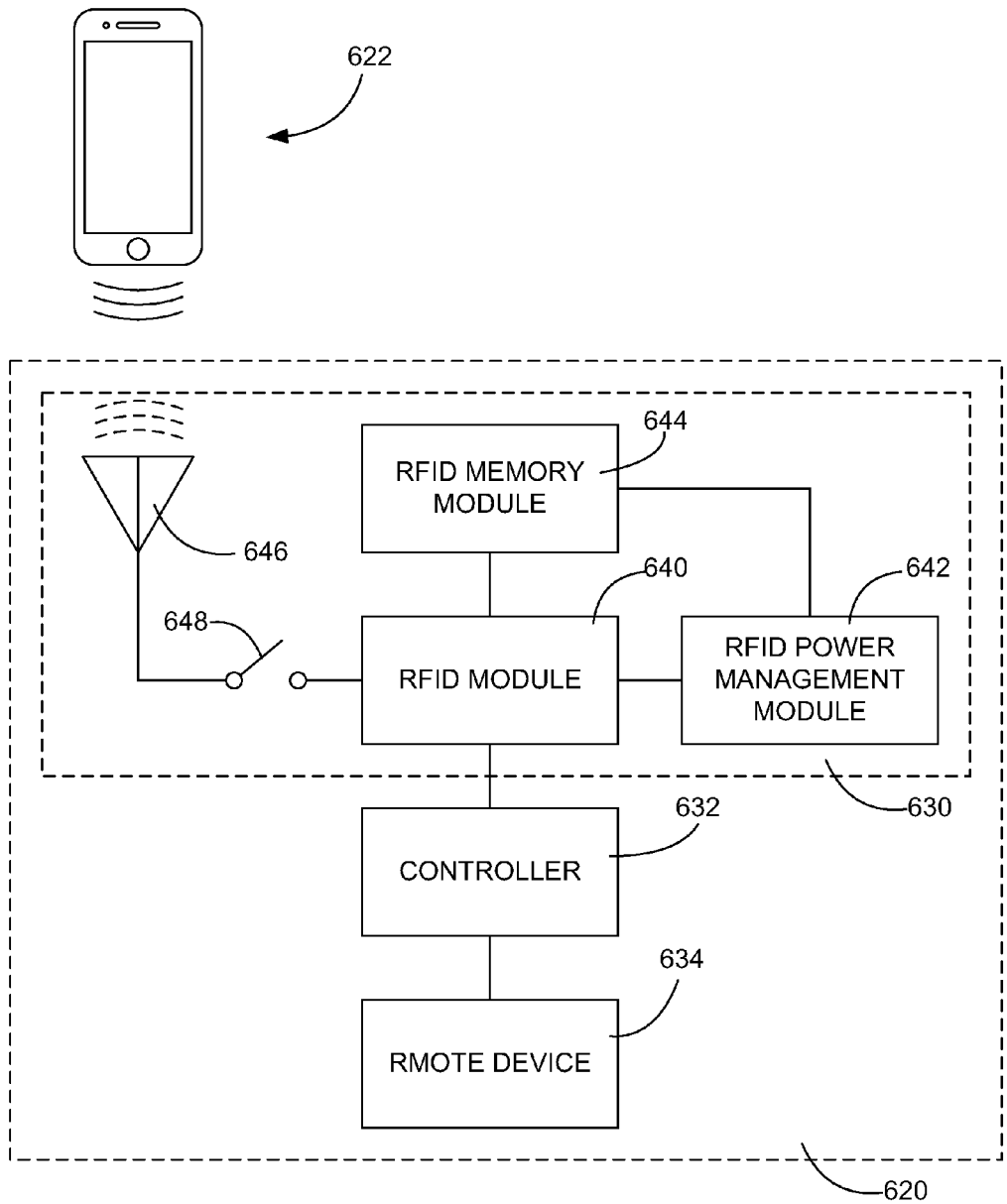
FIG. 10 is a block diagram depicting another example data transmission system of the present invention.

Referring now to FIG. 10 of the drawing, depicted therein is a third example data communication system 620 adapted to communicate with a reader device 622. The reader device 622 is or may be similar to the various reader devices discussed above and will not be described in detail again below.

The example data communication system 620 comprises an NFC system 630, a controller 632, and a remote device 634. The NFC system 630 comprises an RFID module or transceiver 640, an RF power management module 642, a memory module 644, an antenna 646, and, a switch 648. Again, the example RFID module 640 may be active or passive. The memory module 644 is capable of storing data for subsequent retrieval and may be provided in any one of a number of standard memory sizes. The example switch 648 allows the user or possessor of the data communication system 620 to control transmission of data using the NFC system 622 but may be omitted in some implementations of the data communication system 620. As will be discussed in further detail below, the example RFID module 640 is configured to communicate data with (e.g., transmit data to and/or receive data from) a remote device having an RF (e.g, NFC and/or RFID) module that conforms to similar communication standards.

The example controller 632 is operatively connected to the RFID module 640 and the remote device 634. The controller 632 may conventionally comprise a processor and non-volatile and/or non-volatile memory and is capable of running software to control the operation of and transfer data between the RFID module 640 and the remote device 622. The power management module 642 minimizes power consumption by the RFID module 230 and/or memory module 644. The memory module 644 allows the NFC system 630 of the data communication system 620 to store data that may be accessed using the antenna 646 and the RFID module 640.

The controller 632 further is in communication with the remote device 634. The remote device 634 may selected to perform any one or more of a variety of tasks, and a typical example of the remote device 634 would be a sensor. In the example of a sensor forming the remote device 634, the controller 632 would retrieve and/or format data collected by the remote device 634 and use the NFC system 630 to transfer this data to the remote device 622.

Figure 11:
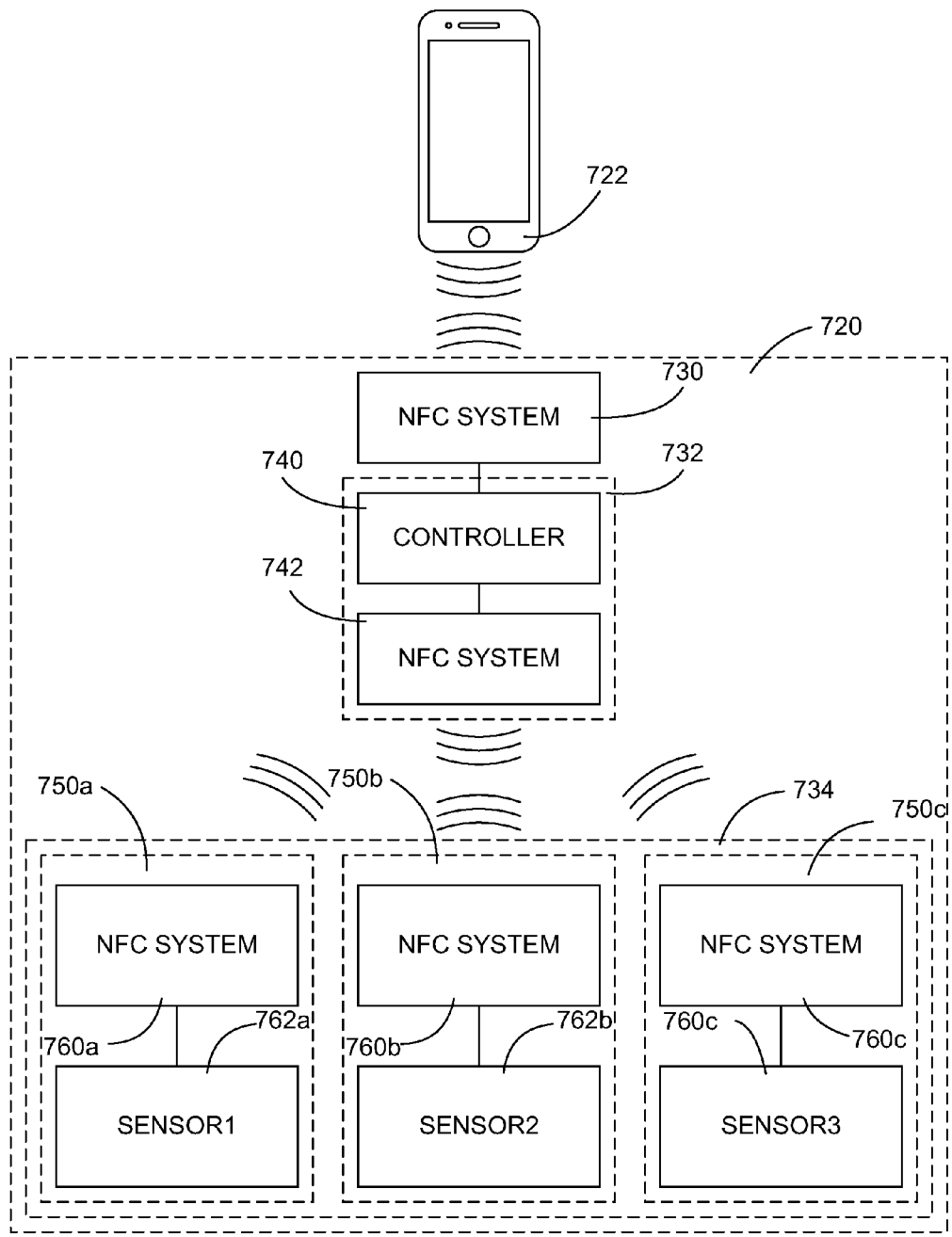
FIG. 11 is a block diagram depicting yet another example data transmission system of the present invention.

FIG. 11 of the drawing depicts a fourth example data communications system 720 adapted to communicate with a reader device 722. Again, the reader device 722 is or may be similar to the various reader devices discussed above and will not be described in detail again below.

The example data communications system 720 comprises a first NFC system 730, a controller system 732, and a remote system 734. Like the NFC systems described above, the example NFC system 730 comprises an RFID module or transceiver, a memory module, and an antenna and possibly an RF power management module and a switch. Again, the example RFID module 640 may be active or passive. The NFC system 730 is capable of storing data for subsequent retrieval and may be provided in any one of a number of standard memory sizes. If a switch is used, the switch would allow the user or possessor of the data communication system 620 to control transmission of data using the NFC system 622. The RFID module 640 allows the NFC system 730 to communicate data with (e.g., transmit data to and/or receive data from) a remote device having an RF (e.g., NFC and/or RFID) module that conforms to similar communication standards.

The example controller system 732 comprises a controller 740 and a second NFC system 742. The example controller 632 is operatively connected to the first and second NFC systems 730 and 742. The controller 732 may conventionally comprise a processor and non-volatile and/or non-volatile memory and is capable of running software to control the operation of and transfer data between the first NFC system 730 and the remote device 722. The controller 740 is further capable of controlling the operation of the second NFC system 742 as will be described in further detail below.

The example remote system 734 comprises first, second, and third remote devices 750a, 750b, and 750c. The remote devices 750a, 750b, and 750c each comprise a remote NFC system 760a, 760b, and 760c and a sensor 762a, 762b, and 762c, respectively.

In the example data communications system 722, the sensors 760a, 760b, and 760c collect data and transmit this data back to the controller 740 using the second NFC system 742 and the associated remote NFC systems 760a, 760b, and/or 760c.

The present invention may be embodied in many forms other than those depicted and described herein. The scope of the present invention should thus be determined based on the claims appended hereto and not the foregoing detailed description.

We claim:

1. A data transmission system comprising:
an RFID system comprising:
an RFID module,
a memory module storing menus, sub menus, and data, where
the memory module stores
a plurality of menu choices associated with the menus,
a plurality of sub menu choices associated with the sub menus, and
a plurality of data choices associated with the data, and
a switch;
a reader system comprising an RFID reader; wherein
activating the switch causes the RFID system to transfer the plurality of menu choices to the reader system;
the reader system displays the plurality of menu choices associated with the menus;
activating the switch causes the RFID system to transfer a selected menu to the reader system in response to the displayed menu choices;
the reader system displays the plurality of sub menu choices associated with the selected menu;
activating the switch causes the RFID system to transfer a selected sub menu to the reader system based on a selection made in response to the displayed sub menu choices;
the reader system displays the it of data choices associated with the selected sub menu choice; and
activating the switch causes the RFID system to transfer data to the reader system based on a selection made in response to the selected data choice.

2. A data transmission system as recited in claim 1, in which the reader system further comprises a reader network module, the data transmission system further comprising a data storage system comprising:
a database network module; and
a database; wherein
data transferred to the reader system is further transmitted to the database using the database network module and the reader network module.

3. A data transmission system as recited in claim 1, in which activating the switch causes the reader system to transmit data to the RFID system in response to a selection made in response to at least one of the sub menu choices.

4. A data transmission system as recited in claim 1, further comprising a network module operatively connected to the RFID system.

5. A data transmission system as recited in claim 1, in which the network module comprises at least one of a Wi-Fi transceiver a cellular transceiver, and a Blue Tooth transceiver.

6. A data transmission system as recited in claim 1, in which the RFID system is capable of operating in an unpowered mode.

7. A data transmission system as recited in claim 1, further comprising a security module that encrypts data transmitted using the RFID system.

* * * * *